United States Patent
Dave et al.

(10) Patent No.: US 10,382,323 B1
(45) Date of Patent: Aug. 13, 2019

(54) FLOODING-BASED ROUTING PROTOCOL HAVING LABEL SWITCHED PATH SESSION INFORMATION

(71) Applicant: Juniper Networks, Inc., Sunnyvale, CA (US)

(72) Inventors: Hiren Bhalchandra Dave, Fremont, CA (US); Nischal Singh, Fremont, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 26 days.

(21) Appl. No.: 15/394,528

(22) Filed: Dec. 29, 2016

(51) Int. Cl.
*H04L 12/721* (2013.01)
*H04L 12/751* (2013.01)
*H04L 12/803* (2013.01)
*H04L 12/26* (2006.01)
*H04L 12/723* (2013.01)
*H04L 12/725* (2013.01)

(52) U.S. Cl.
CPC .......... *H04L 45/32* (2013.01); *H04L 43/0882* (2013.01); *H04L 43/16* (2013.01); *H04L 45/02* (2013.01); *H04L 45/30* (2013.01); *H04L 45/507* (2013.01); *H04L 47/125* (2013.01)

(58) Field of Classification Search
CPC .................. H04L 45/32; H04L 43/0882
See application file for complete search history.

(56) References Cited

U.S. PATENT DOCUMENTS

| 7,184,437 B1 | 2/2007 | Cole et al. | |
| 2002/0118647 A1* | 8/2002 | Maeno | H04L 45/12 370/238.1 |
| 2003/0129988 A1* | 7/2003 | Lee | H04W 28/16 455/450 |

(Continued)

FOREIGN PATENT DOCUMENTS

| EP | 2 92488 | * 9/2015 | H04B 76/06 |
| EP | 2924888 | * 9/2015 | H04B 76/06 |

OTHER PUBLICATIONS

Rosen et al., "Multiprotocol Label Switching Architecture," Network Working Group, RFC 3031, Jan. 2001, 61 pp.

(Continued)

*Primary Examiner* — Michael Thier
*Assistant Examiner* — Zhensheng Zhang
(74) *Attorney, Agent, or Firm* — Shumaker & Sieffert, P.A.

(57) ABSTRACT

An enhanced, flooding-based routing protocol is described that provides label switched path session information. In one example, a transit router is intermediately positioned between at least two label edge routers. The transit router is configured to determine a maximum number of LSPs concurrently supported by the transit router and determine a number of LSPs concurrently established by the transit router and for which the transit router is responsible for switching packets to one or more of the two label edge routers. The transit router generates, in accordance with a link state routing protocol, a link state routing protocol (Continued)

message that specifies the LSP session information as the maximum number of LSP and the number of LSPs concurrently established. The transit router further transmits, to the label edge routers, the link state routing protocol message.

12 Claims, 7 Drawing Sheets

(56) References Cited

U.S. PATENT DOCUMENTS

| | | | |
|---|---|---|---|
| 2006/0092952 A1* | 5/2006 | Boutros | H04L 41/06 370/400 |
| 2008/0044181 A1 | 2/2008 | Sindhu | |
| 2016/0234109 A1* | 8/2016 | Iovanna | H04L 45/70 |

OTHER PUBLICATIONS

Thomas et al., "LDP Applicability," Network Working Group, RFC 3037, Jan. 2001, 7 pp.
Moy, "OSPF Version 2," Network Working Group, RFC 2328, Apr. 1998, 244 pp.
Vasseur, et al., "A Link-Type sub-TLV to Convey the Number of Traffic Engineering Label Switched Paths Signalled with Zero Reserved Bandwidth across a Link," Network Working Group, RFC 5330, Oct. 2008, 8 pp.
International Standards Organization, "Information Technology-Telecommunications and Information Exchange Between Systems—Intermediate System to Intermediate System Intra-domain Routeing Information Exchange Protocol for Use in Conjunction with the Protocol for Providing the Connectionless-Mode Network Service (ISO 8473)," ISO/IEC 10589:2002, dated Nov. 15, 2002, 210 pp.

* cited by examiner

| TYPE 42 | LENGTH 44 | MAX 46 | ESTABLISHED 48 |

FIG. 2A

| TYPE 42 | LENGTH 44 | MAX 46-0 | MAX 46-2 | ESTABLISHED 48-0 | ESTABLISHED 48-2 |
| ESTABLISHED 48-1 | | | | | MAX 46-1 |

FIG. 2B

FLOODING-BASED ROUTING PROTOCOL HAVING LABEL SWITCHED PATH SESSION INFORMATION

TECHNICAL FIELD

The invention relates to computer networks and, more particularly, to routing protocols used within computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

Certain devices within the network referred to as routers use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols use flooding-based distribution mechanisms to announce topology information to routers within the network. These routing protocols typically rely on routing algorithms that require each of the routers to have synchronized routing topology information. For example, Open Shortest Path First (OSPF) and Intermediate system to intermediate system (IS-IS) routing protocols are link state protocols that use link state messages to ensure their routing topology is synchronized with respect to available interfaces, metrics and other variables associated with network links. For example, OSPF utilizes Link State Advertisements (LSAs) while IS-IS uses Link State protocol data units (LSPs) to exchange information. A router generating a link state message typically floods the link state message throughout the network such that every other router receives the link state message.

In network topologies where routers are connected by point-to-point connections, each router floods link state messages to adjacent routers reachable on each interface to ensure synchronization. In networks using multi-access media, such as an Ethernet network, the routers within the network flood the link state messages to all other routers. In either case, the receiving routers construct and maintain their own network topologies using the link information received via the link state messages. IS-IS is specified in "Intermediate system to Intermediate system routing information exchange protocol for use in conjunction with the Protocol for providing the Connectionless-mode Network Service (ISO 8473)", ISO, ISO/IEC 10589:2002, the entire contents of which is incorporated herein by reference.

Recently, flooding-based routing protocols have been extended to carry significant information between routers that is ancillary to routing control. For example, in addition to carrying topology information, routing protocols have been extended to carry implementation-specific information, such as configuration data, hardware inventory, additional capability information and other information.

SUMMARY

In general, an enhanced, flooding-based routing protocol is described that provides label switched path (LSP) session information. The techniques may allow conventional flooding-based routing protocols to be used to specify, as LSP session information (LSI), a number of LSPs supported by an intermediately positioned label switch router (LSR), which may also be referred to as a transit router. Such LSI may allow label edge routers (LER) that act as an ingress to a LSP to better identify which LSRs are available to support new LSPs, while also enabling load balancing of LSPs amongst the LSRs. Furthermore, different vendors or types of LSRs may support different numbers of LSPs, and the LSI may allow LERs to avoid overloading those LSRs that support fewer numbers of LSPs.

In one aspect, the techniques of the disclosure describe a method of transmitting label switched path (LSP) session information, the method including: determining, by a transit router intermediately positioned between at least two label edge routers, a maximum number of LSPs concurrently supported by the transit router; determining, by the transit router, a number of LSPs concurrently established by the transit router and for which the transit router is responsible for switching packets to one or more of the two label edge routers; generating, by the transit router and in accordance with a link state routing protocol, a link state routing protocol message that specifies the LSP session information as the maximum number of LSP and the number of LSPs concurrently established; and transmitting, by the transit router and to the label edge routers, the link state routing protocol message.

In another aspect, the techniques of the disclosure describe a method of selecting a path over which to establish a label switched path (LSP), the method including: receiving, by an ingress label edge router positioned at an edge of a transit network and from a transit router intermediately positioned between the ingress label edge router and an egress label edge router, a link state routing protocol message in accordance with a link state routing protocol, the link state routing protocol message specifying LSP session information as a maximum number of LSPs concurrently supported by a transit router and a number of LSPs concurrently established by the transit router and for which the transit router is responsible for switching packets to one or more of the two label edge routers; updating, by the ingress label edge router, a representation of a topology of the network to associate the transit router with the LSP session information; resolving, by the ingress label edge router, the representation of the topology to select a path over which to establish an LSP based on the LSP session information; establishing, by the ingress label edge router, the LSP over the selected path; and forwarding, by the ingress label edge router, network packets via the LSP.

A transit router intermediately positioned between at least two label edge routers, the transit router configured to: determine a maximum number of LSPs concurrently supported by the transit router; determine a number of LSPs concurrently established by the transit router and for which the transit router is responsible for switching packets to one or more of the two label edge routers; generate, in accordance with a link state routing protocol, a link state routing protocol message that specifies the LSP session information as the maximum number of LSP and the number of LSPs concurrently established; and transmit, to the label edge routers, the link state routing protocol message.

In another aspect, the techniques of the disclosure describe an ingress label edge router positioned at an edge of a transit network, configured to: receive, from a transit router intermediately positioned between the ingress label edge router and an egress label edge router, a link state routing protocol message in accordance with a link state routing protocol, the link state routing protocol message specifying LSP session information as a maximum number of LSPs concurrently supported by a transit router and a number of LSPs concurrently established by the transit router and for which the transit router is responsible for switching packets to one or more of the two label edge routers; update a representation of a topology of the network to associate the transit router with the LSP session information; resolve the representation of the topology to select a path over which to establish an LSP based on the LSP session information; establish the LSP over the selected path; and forward network packets via the LSP.

In another aspect, the techniques of the disclosure describe a non-transitory computer-readable medium including instructions, that, when executed, cause a transit router intermediately positioned between at least two label edge routers to: determine a maximum number of LSPs concurrently supported by the transit router; determine a number of LSPs concurrently established by the transit router and for which the transit router is responsible for switching packets to one or more of the two label edge routers; generate, in accordance with a link state routing protocol, a link state routing protocol message that specifies the LSP session information as the maximum number of LSP and the number of LSPs concurrently established; and transmit, to the label edge routers, the link state routing protocol message.

In another aspect, the techniques of the disclosure describe a non-transitory computer-readable medium including instructions, that, when executed, cause an ingress label edge router positioned at an edge of a transit network to: receive, from a transit router intermediately positioned between the ingress label edge router and an egress label edge router, a link state routing protocol message in accordance with a link state routing protocol, the link state routing protocol message specifying LSP session information as a maximum number of LSPs concurrently supported by a transit router and a number of LSPs concurrently established by the transit router and for which the transit router is responsible for switching packets to one or more of the two label edge routers; update a representation of a topology of the network to associate the transit router with the LSP session information; resolve the representation of the topology to select a path over which to establish an LSP based on the LSP session information; establish the LSP over the selected path; and forward network packets via the LSP.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 2A is a block diagram illustrating an example encoding of LSI as described herein for the IS-IS routing protocol.

FIG. 2B is a block diagram illustrating another example encoding of LSI as described herein for the IS-IS routing protocol.

DETAILED DESCRIPTION

Figure 1:
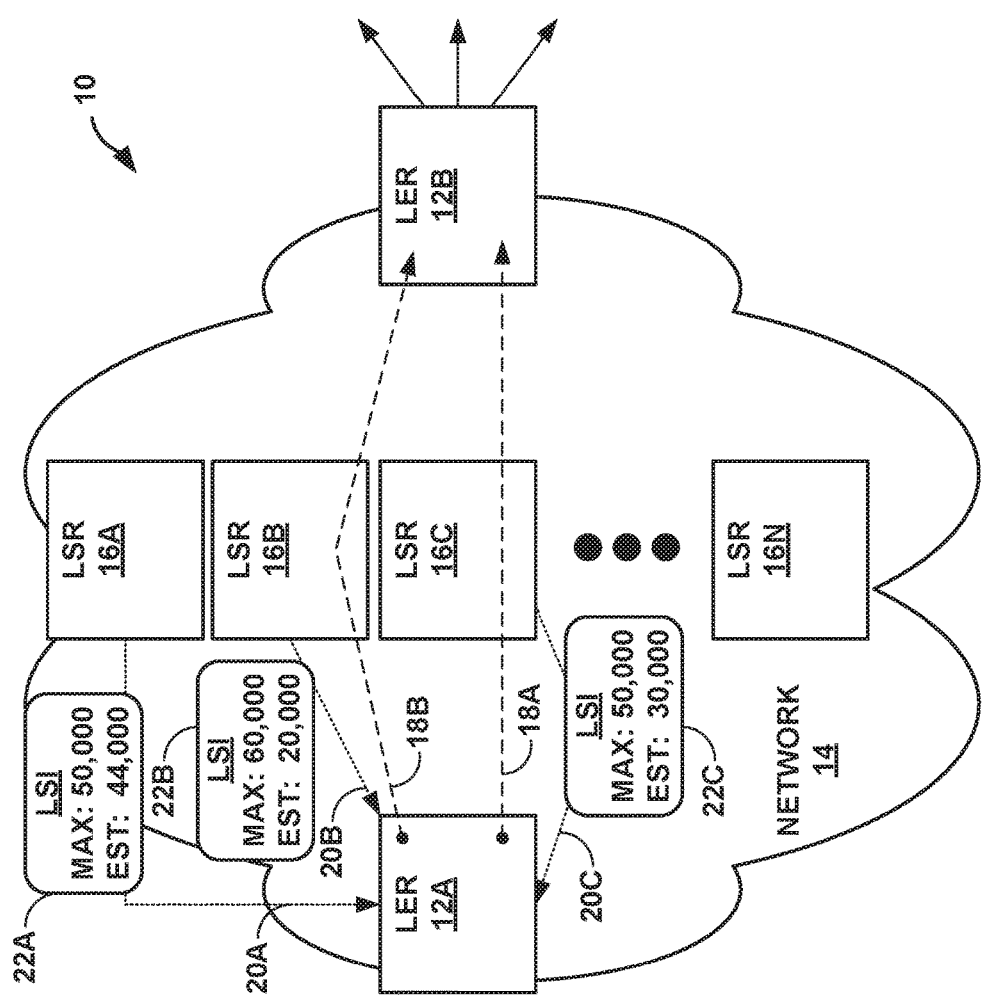
FIG. 1 is a block diagram illustrating an example of a network system that supports an enhanced link state protocol in accordance with various aspect of the techniques described in this disclosure.

FIG. 1 is a block diagram illustrating an example network system 10 that supports an enhanced link state protocol in accordance with various aspect of the techniques described in this disclosure. As shown in the example of FIG. 1, network system 10 includes a network 14 supported, at least in part, by label edge routers (LERs) 12A and 12B ("LERs 12") and label switching routers (LSRs) 16A-16N ("LSRs 14").

LERs 12 and LSRs 16 may each generally represent a network device that forwards or "switches" data units, such as packets or cells, via a set path or route through a network, such as network 14, according to labels associated with each data unit. Accordingly, each of routers 12 may represent and be referred to herein as a "Label Edge Routers" as each of LERs 12 are positioned at the edge of network 14, while each of routers 16 may be referred to as "Label Switching Router" as each of LSRs 16 are intermediately positioned in the interior of network 14 between LERs 12. LSRs 16 may also be referred to as transit routers 14 given that LSRs 16 only transport packets from one LER to another LER and do not admit traffic into network 14 or forward traffic out of network 14.

While described with respect to this particular type of network device, e.g., routers 12 and 16, any network device capable of forwarding data units according to labels may implement the techniques described herein to facilitate establishment of LSPs within a label switching network, such as network 14. Moreover, while described with respect to a Multi-Protocol Label Switching (MPLS) family of label distribution protocols, the techniques may be implemented with respect to any protocol cable of distributing labels or any general label distribution protocol and should not be limited to MPLS label distribution protocols.

As shown in FIG. 1, network system 10 includes a network 14. Network 14 may represent a public network that is owned and operated by a service provider to interconnect a plurality of edge networks, such as customer networks (which are not shown for ease of illustration purposes). As a result, network 14 may be referred to herein as a Service Provider (SP) network or, alternatively, as a "core network" considering that network 14 acts as a core to interconnect a plurality of member or edge networks, such as customer network. Exemplary service providers include Verizon Communications Inc. or American Telephone & Telegraph (AT&T) Company. These service providers may lease portions of network 14 or provide services offering interconnection through network 14 to customer network, which may lease the portions or purchase the services provided by network 14.

Customer networks may generally refer to a network owned and operated by a large entity, such as a university, corporation, business, or other facility or enterprise. Customer network may operate according to a wide variety of network protocols, such as any of the 802.3X family of network protocols related to the Ethernet protocol, any of the 802.1X family of wireless networking protocols, an Internet Protocol (IP) protocol, an Asynchronous Transfer Mode (ATM) protocol, and a Transmission Control Protocol (TCP). Moreover, customer network 16 may comprise a Virtual Private Network (VPN), a Large Area Network (LAN), or a Wide Area Network (WAN). Although not shown in FIG. 1 for ease of illustration purposes, customer network may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Network 14 may interconnect the plurality of customer networks according to any number of protocols. Commonly, however, a transit network, such as network 14, that interconnects various customer networks 16 to one another implements a mechanism or protocol for quickly switching data units, which may comprise packets, cells or any other discrete unit of data. Often, these transit networks that implement these mechanisms are referred to as a "data-switched network" or "packet-switched network." Moreover, these transit networks, being packet based, may implement a so called "Internet protocol" (IP), and as a result may be referred to as an "IP network" or an "IP packet-based network."

Multi-Protocol Label Switching (MPLS) refers to one exemplary mechanism or category of protocols that network 14 may implement to switch data units via one or more paths through network 14. For purposes of illustration, it is assumed herein that network 14 implements the MPLS data-carrying mechanism (e.g., one or more of the MPLS protocols). Network 14 may therefore be referred to herein as an "MPLS network 14." While described below with respect to the MPLS category of protocols, the techniques may be utilized by any network device that implements any protocol by which to forward data units according to labels through a network.

The MPLS protocols may execute between layer 2 and layer 3 of the Open Systems Interconnection (OSI) model and are often referred to as layer 2.5 protocols. Network 14 may implement one or more of the MPLS protocols to transmit many different types of data units that correspond to different protocols, including IP packets, Asynchronous Transfer Mode (ATM) cells, Ethernet frames and Synchronous Optical Networking (SONET) frames, hence the name "multi-protocol label switching." Included within the MPLS category of protocols are one or more other protocols that network 14 may implement to establish the one or more paths through the network, such as a Label Distribution Protocol (LDP), and manage the path, such as a Resource Reservation Protocol (RSVP) or extensions thereof (e.g., a so-called RSVP Traffic Engineering or RSVP-TE protocol). Further information regarding MPLS and the various features of MPLS, as well as, general architectural information regarding MPLS can be found in Request for Comments (RFC) 3031, titled "Multiprotocol Label Switching Architecture," prepared by the Network Working Group of the Internet Engineering Task Force (IETF), dated January 2001, herein incorporated by reference.

Network 14 may, for example, implement RSVP or LDP to establish at least one LSP 18A or 18B through network 14. More particularly, network 14 may include the above described plurality of LERs 12 which may, as described above, represent LERs. Typically, LERs 12 establish the one or more paths through network 14 in accordance with a network protocol, such as LDP. Further information regarding LDP, the various services and features of LDP, as well as, general information regarding labels and the applicability of LDP to MPLS can be found in Request for Comments (RFC) 3037, titled "LDP Applicability," prepared by the Network Working Group of the Internet Engineering Task Force (IETF), dated January 2001, herein incorporated by reference.

In the example of FIG. 1, LER 12A may establish a path 18A through network 14 that flows from LER 12A to LSR 16C and from LSR 16C to LER 12B. A path, such as path 18A, typically represents a unidirectional flow of network traffic that is established according to one of the MPLS signaling protocol (e.g., LDP). For bi-directional traffic, LERs 12 may establish a pair of unidirectional paths, and the techniques should not be limited strictly to traffic in one direction.

To determine the path, each of routers 12 and 16 may first determine a topology of network 14 using flooding-based routing protocols. The flooding-based routing protocols may allow routers 12 and 16 to announce topology information to each other and synchronize link-state databases maintained by each of routers 12 and 16. The flooding-based routing protocols may "flood" topology information such that each of routers 12 and 16 receive the same topology information, thereby allowing each of routers 12 and 16 to individually form a representation of the topology of network 14 (e.g., using a graph data structure in which nodes of the graph data structure represent routers 12 and 16 and edges of the graph data structure represent links coupling routers 12 and 16 to one another). Flooding-based routing protocols may also be referred to as link state protocols. Example flooding-based routing protocols or, in other words, link state protocols include an Intermediate System-to-Intermediate System (IS-IS) routing protocol and an Open Shortest Path First (OSPF) routing protocol.

Once each of routers 12 and 16 construct the graph data structure or other representation of the topology of network 14, LER 12A may resolve the representation of the topology of network 14 to select path 18A (e.g., by performing some shortest path selection algorithm, which may be some variant of Dijkstra's algorithm). LER 18A may select the path and use LDP to establish path 18A.

When LER 12A establishes path 18A in accordance with LDP, path 18A may only transmit or carry network traffic from LER 12A to LER 12B but may not transmit or carry network traffic from LER 12B to LER 12A. Considering this unidirectional flow of network traffic along a given path, for each path, one router may be referred to as an "ingress network device" while another router may be referred to as an "egress network device." With respect to path 18A, LER 12A may represent the ingress network device, as LER 12A acts as a point of ingress for network traffic to enter path 18A, and LER 12B may represent the egress network device, as LER 12B may represent a point of egress for the network traffic from path 18A. LSR 16C, which neither acts as an ingress point for traffic entering path 18 nor an egress point for traffic leaving path 18, may be referred to as a "transit router" or, more generally, a "transit network device."

LER 12A may establish path 18A by first discovering other of routers 12 and 16 that implement LDP. These other routers 12 and 16 may be referred to as "LDP peers." Upon discovering each LDP peer, LER 12A may initiate an LDP session with the discovered one of routers 12 and 16. LER 12A may then, via the LDP session, negotiate parameters for the LDP session, such as a method by which to exchange labels. After negotiating the parameters, LER 12A and the other one of routers 12 and 16 exchange one or more labels in accordance with the negotiated parameters.

LER 12A may, for example, establish an LDP session with LSR 16C to exchange labels. LER 12A may, via the established LDP session, advertise bindings between a Forwarding Equivalence Class (FEC) and a label. A FEC refers to a set of data units that a given network device forwards to the same next hop out of the same interface with the same treatment, e.g., quality or class of service. A label may uniquely identify a FEC and each of routers 12 and 16 may maintain a plurality of FECs. LER 12A may also receive bindings between FECs and labels from LSR 16C. LER 12A may resolve the bindings received from LSR 16C with those already maintained by LER 12A to resolve paths through network 14 in the manner described above.

In this manner, routers 12 may resolve the topology to determine the one or more paths through network 14 by which to forward packets associated with each FEC. In some instances, these bindings may be referred to below as a binding or association between a label and a next hop, as the FEC may be used to determine the next hop along a given path. Based on these bindings, each path through network 14 may be associated with one or more and, often a plurality of labels, identifying each subsequent next hop along the path. LER 12A may also reserve bandwidth or other resources via the managing aspect or protocol of MPLS, e.g., RSVP. In this manner, LER 12A may ensure a particular quality, level or class of service for a given path. For example, LER 12A may reserve 10 mega-bits per second (Mbps) of bandwidth for path 18A in accordance with RSVP. These MPLS protocols (e.g., LDP and RSVP) may each represent or be referred to herein as an "MPLS signaling protocol," as these protocols signal a path and the reservation of resources along the path within the network.

After establishing path 18A by exchanging control plane signaling messages in accordance with one of the MPLS protocols, LER 12A may receive a data unit (e.g., an IP packet) from a customer network. Upon receiving the packet, LER 12A may determine to which of a plurality of FECs the packet belongs by inspecting the data unit and, based on the determined FEC, append a corresponding label to the data unit. The label may be appended to the data unit as an MPLS header that includes or defines a label stack of one or more labels. Much like a software stack data structure, LER 12A may push the corresponding label onto the label stack of the MPLS header. LER 12A may then route the data unit along a given path through network 14 based on the label.

Assuming LER 12A forwards the data unit via path 18A, LSR 16C receives the data unit with the appended label. LSR 16C may then swap the label with another label that LSR 16C associates with path 18A, where the swap may comprise removing or popping the original label appended by LER 12A to the label stack and pushing or appending the label maintained by LSR 16C for path 18A onto the label stack. LSR 16C may swap labels because labels may not be unique to a given path. In other words, each of routers 12 and 16 may maintain a separate label space, which in some instances may overlap. LER 12A may, for example, append a label for a first path and router 16C may append the same label for a second path different from the first. Thus, each of routers 12 and 16 may maintain conflicting label spaces. To resolve this issue, each of routers 12 and 16 may swap labels to correctly identify each next hop along a path through network 14.

After receiving the data unit and swapping the labels, LSR 16C may forward the data to LER 12B along path 18A. LER 12B may inspect the label pushed by LSR 16C, and determine that the label identifies path 18A, which requires LER 12B to remove the data unit from path 18A and forward the packet to the intended destination. LER 12B may remove or pop the label from the label stack of the MPLS header, and forward the data unit to the destination indicated in the original data unit header, such as an IP header, instead of forwarding the data unit based on a label in the MPLS header. LER 12B may then forward the data unit to the destination via any one of a number of routes, as indicated in FIG. 1 by the plurality of arrows exiting network 14 from LER 12B. In this manner, network 14 may implement one or more MPLS protocols to establish paths and switch data units along the paths according to the labels associated with the paths. In this respect, paths, such as path 18A, may be referred to as an LSP.

Network 14 may implement MPLS for a number of reasons. First, MPLS moves path selection and route decisions to the edges of the network, thereby improving forwarding performance in the core of the network. To illustrate, in the above example, only LERs 12 inspect the data unit to determine to which FEC the data unit belongs and the destination indicated by the original data unit, respectively. LSR 16C, however, forwards the data unit based on the appended label and may forgo further packet inspection. While LERs 12 may establish and terminate paths and therefore act as ingress and egress network devices that perform this inspection prior to admitting data units to and removing data units from paths, transit network devices, such as LSRs 16, may forgo the inspection and instead forward data units based on the labels regardless of the protocol to which each packet corresponds. As a result, transit network devices, such as LSRs 16, may more efficiently forward data units, as LSRs 16 may forward data units based on labels without having to perform additional inspection of data units.

Second, as a result of the efficient forwarding described above, transit MPLS network devices, such as LSRs 16, may be more cost efficient. That is, LSRs 16 may not require additional hardware and/or software to perform the packet inspection and therefore may not require the additional cost associated with implementing this logic. Third, MPLS networks, such as network 14 may transmit any type of data unit or network traffic that corresponds to a number of different protocols, including IP, an Ethernet protocol, and an ATM protocol. In this respect, MPLS may not require any protocol-specific hardware architecture in the core of the network and may be considered protocol independent. Thus, service providers may employ MPLS network 14 to service a wide variety of customers that implement a wide variety of network architectures to form customer networks.

In some environments, different types of routers from different vendors are deployed within a network, such as network 14. Due to differences in storage capacities, hardware, and software configurations between the different routers of different vendors, the different types of routers may provide capabilities for different quantities of LSP state information (LSI).

In one example, one of LSR 16A-16C (e.g., a core router) supports a maximum quantity of deployed LSPs (e.g., 50,000 LSPs) that is less than a maximum quantity of deployed LSPs (e.g. 80,000 LSPs) that LER 12A (e.g., an ingress router) supports. When LSR 16A reaches the 50,000 maximum quantity of deployed LSPs, LSR 16A may not be able to notify LER 12A that LSR 16A cannot deploy further LSPs. Although the LER 12A has sufficient bandwidth to service the traffic, LSR 16A may be unable to establish an additional LSP to service subsequent traffic from LER 12A. In the above example, LER 12A may transmit requests to LSR 16A to deploy an additional LSP. However, LSR 16A may drop the requests because LSR 16A has reached its maximum quantity (i.e., 50,000 in the example of FIG. 1) of deployed LSPs. Thus, LER 12A may continue to re-transmit requests to LSR 16A to deploy an additional LSP, even though LSR 16A continues to drop the requests. As such, LER 12A may be unable to establish an LSP via LSR 16A wasting both time and resources (e.g., computing resources including memory bandwidth and processing resources) in a useless attempt to establish the LSP via LSR 16A.

In accordance with the techniques described in this disclosure, a transit router, such as LSR 16A that is between two LERs, such as LER 12A and 12B, determines a maximum number of LSPs concurrently supported by LSR 16A (e.g., 50,000 LSPs.). Further, LSR 16A may determine a number of LSPs that LSR 16A has concurrently established and for which LSR 16A is responsible for switching packets to one or more of LERs 12A-12B. LSR 16A generates, in accordance with a link state routing protocol, a link state routing protocol message, such as one of link state routing protocol messages 20A-20C (collectively, "link state routing protocol messages 20"), that specifies a corresponding LSI, such as a corresponding one of LSIs 22A-22C (collectively, "LSIs 22"), as a maximum number of LSPs and the number of LSPs concurrently established. In some examples, the link state routing protocol message further specifies the LSI 22 as a minimum number of LSPs established by LSR 16A. In some examples, the link state routing protocol is OSPF. In other examples, the link state routing protocol is IS-IS.

LSR 16A floods the link state routing protocol message to LERs 16A-16B. In some examples, LSR 16A determines when the number of LSPs that LSR 16A has concurrently established exceeds one or more predetermined thresholds (e.g., 5%, 10%, 25%, 50%, 75%, 90%, 95%, or 99%) of the maximum number of LSPs. Upon determining that the number of LSPs that LSR 16A has concurrently established exceeds the predetermined threshold, LSR 16A floods the link state routing protocol message to LERs 16A-16B. In other examples, LSR 16A floods the link state routing protocol message to LERs 16A-16B upon receiving a request from one of LERs 16A-16B to establish a new LSP.

In further examples, the ingress label edge router, such as LER 12A, receives the link state routing protocol message 20A from LSR 16A. In response to receiving the link state routing protocol message, LER 12A updates a representation of a topology of the network 14 to associate LSR 16A with the LSI 22A. Further, LER 12A resolves the representation of the topology to select a path over which to establish an LSP based on the LSI 22A. LER 12A additionally establishes the LSP over the selected path and forwards network packets via the LSP.

In some examples, the link state routing protocol message indicates that the number of LSPs concurrently established by LSR 16A is substantially equal to a predetermined threshold (e.g., 90%, 95%, 99%) of the maximum number of LSPs. In response to receiving such a link state routing protocol message (e.g., one of link state routing protocol messages 20), LER 12A resolves the representation of the topology to select a path over which to establish an LSP based on the LSI 22, wherein the path does not include the transit router. In other words, upon receiving a link state routing protocol message indicating that LSR 16A has concurrently established a number of LSPs approximately equal to the maximum number of LSPs supported by LSR 16A, LER 12A selects a path that does not include LSR 16A. In this manner, LER 12A may avoid sending requests to LSR 16A to establish additional LSPs when LSR 16A may not have the capability to do so.

Upon receiving link state routing protocol message 20A comprising LSI 22A, LER 12A may resolve the representation of the network topology in several manners. In one example where LER 12A resolves the representation of the network topology, LER 12A determines, based on LSI 22A, the percentage of LSPs that LSR 16A has concurrently established along a path as compared to the available capacity of the LSR 16. In the example of FIG. 1, LSR 16A has established 44,000 LSPs, and supports a maximum of 50,000 concurrent LSPs. Thus, LER 12A may determine that LSR 16A is at 88% of available capacity. Similarly, LER 12A determines, based on LSI 22B, the percentage of LSPs that LSR 16B has concurrently established. LSR 16B has established 20,000 LSPs, and supports a maximum of 60,000 concurrent LSPs. Thus, LER 12A may determine that LSR 16B is at 33.3% of available capacity. Thus, upon subsequently selecting an LSR 16 to establish a new LSP, LER 12A selects the LSR 16 using the lowest percentage of the LSR 16's available capacity (e.g., LSR 16B). By using the percentage of available capacity computed via LSI 22 obtained through link state routing messages 20, LER 12A may load balance new LSPs across LSRs 16 such that fewer LSPs are concentrated on individual ones of LSRs 16, thereby reducing the likelihood of network congestion and the resulting dropping of packets that may result from overutilization of LSRs 16.

In another example where LER 12A resolves the representation of the network topology, LER 12A determines, based on LSI 22A, a shortest path for the destination traffic. In the example of FIG. 1, LSR 16A has established 44,000 LSPs, and supports a maximum of 50,000 concurrent LSPs. LSR 16B has established 20,000 LSPs, and supports a maximum of 60,000 concurrent LSPs. LER 12A further determines that LSR 16A provides a shorter path for destination traffic than LSR 16B. Upon subsequently selecting an LSR 16 to establish a new LSP, LER 12A selects LSR 16A until LSR 16A is at maximum available capacity (e.g., LSR 16A supports another concurrent 6,000 LSPs). While LER 12A determines that LSR 16A has fully used its available capacity, LER 12A selects LSR 16B to establish new LSPs until LER 12A is no longer at its maximum available capacity. In situations where LSR 16A provides a shorter path than LSR 16B, by using 100% of the available capacity of LSR 16A prior to establishing LSPs on LSR 16B, LER 12A may load balance new LSPs across LSRs 16 so as to ensure a maximum number of LSPs are established across the most efficient, fastest, or shortest paths across network 14.

In yet another example where LER 12A resolves the representation of the network topology, LER 12A determines, based on LSI 22, whether the number of LSPs that an LSR 16 has concurrently established exceeds one or more predetermined thresholds of the maximum number of LSPs that LSR 16 supports (e.g., whether LSR 16 has consumed 75%, 80%, 85%, 90%, 95%, or 99% of the available capacity of the LSR 16). In the example of FIG. 1, each of LSRs 16 has a predetermined threshold of 85% of the available capacity of the LSR 16. Further, LER 16A determines, based on LSI 22A, that LSR 16A has established 44,000 LSPs, and supports a maximum of 50,000 concurrent LSPs. Thus, based on LSI 22A, LER 12A determines that LSR 16A is at 88% of available capacity (44,000/50, 000=88%), and further, LER 12A determines that LSR 16A has exceeded the predetermined threshold (e.g., 88%, the percentage of the consumed available capacity of LSR 16A, is greater than 85%, the predetermined threshold). Similarly, LER 12A determines, based on LSI 22B, that LSR 16B has established 20,000 LSPs, and supports a maximum of 60,000 concurrent LSPs. Thus, based on LSI 22B, LER 12A may determine that LSR 16B is at 33.3% of available capacity and has not exceeded the predetermined threshold (e.g., 33.3%, the percentage of the consumed available capacity of LSR 16B, is less than 85%, the predetermined threshold). Accordingly, upon subsequently selecting an LSR 16 to establish a new LSP, LER 12A does not select an LSR 16 that has exceeded the predetermined threshold (e.g., LSR 16A), and instead selects an LSR 16 that has not exceeded the predetermined threshold (e.g., LSR 16B). Thus, by using the predetermined threshold computed via LSI 22 obtained through link state routing messages 20, LER 12A may load balance new LSPs across LSRs 16 such that fewer LSPs are concentrated on individual ones of LSRs 16 and no single LSR 16 fully consumes its available capacity, thereby reducing the likelihood of network congestion and the resulting dropping of packets that may result from overutilization of LSRs 16.

In the foregoing examples, upon selecting an LSR 16 over which to establish a subsequent LSP, LER 12A may select the LSR 16 that has established the fewest LSPs. Further, LER 12A may select the LSR 16 that has the most available capacity (e.g., has consumed the smallest percentage of its available capacity). In addition, LER 12A may select an LSR 16 according to, or in combination with, other criteria received via LSI 22, such as based on a determination of which of LSRs 16 have consumed the least network bandwidth or the least percentage of the available bandwidth of each LSR 16. For example, upon establishing a subsequent LSP, LER 12A first selects a group of one or more LSRs 16 according to which of LSRs 16 have consumed the least network bandwidth or the least percentage of the available bandwidth of each LSR 16. Subsequently, LER 12A selects an LSR 16 upon which to establish the LSP based on a determination of which LSR 16 of the group of LSRs 16 has established the fewest LSPs or has the highest percentage of available capacity, as described above. In another example, upon establishing a subsequent LSP, LER 12A first selects a group of one or more LSRs 16 according to a determination of which of LSRs 16 has established the fewest LSPs or has the highest percentage of available capacity, using LSI 22 in the fashion as described above. Subsequently, LER 12A selects an LSR 16 upon which to establish the LSP based on a determination of which LSR 16 of the group of LSRs 16 has consumed the least network bandwidth or the least percentage of the available bandwidth of each LSR 16.

Furthermore, LER 12A may perform additional operations with respect to LSI 22. For example, LER 12A may establish LSPs through LSRs 16 in a manner that attempts to balance a number of LSPs across each of LSRs 16. In the example of FIG. 1, LER 12A may receive LSI 22 via each of link state routing protocol messages 20. LER 12A may update the representation of the topology (e.g., which may be defined by way of a graph data structure) to include LSIs 22, associating each of LSIs 22 with the corresponding one of LSRs 16.

Based on the representation of the topology including LSIs 22, LER 12A may identify which of LSR 16 has a largest available capacity (which may be defined, as one example, as a maximum number of sessions (MAX) of each of LSIs 22 minus the corresponding currently established number of sessions (EST) of each of LSIs 22). Although described with respect to an available capacity, the load balancing aspects of the techniques may be performed with respect to the number of currently established sessions (EST) of each of LSIs 22, where LER 12A selects the one of LSRs 16 having a lowest number of currently established sessions. Likewise, the load balancing aspects of the techniques may be performed with respect to the one of LSRs 16 having a highest max number of concurrent sessions (MAX) specified by each of LSIs 22, or any combination of the foregoing in which multiple different criteria are utilized when performing the load balancing aspects of the techniques described in this disclosure.

In any event, LER 12A may resolve the representation of the topology based on LSI 22 to load balance LSPs across LSRs 16. The load balancing may promote more efficient operation of network 14 as there may be less LSPs concentrated on individual ones of LSRs 16, reducing the likelihood of network congestion and the resulting dropping of packets that may result from overutilization of LSRs 16, etc.

In the example of FIG. 1, LSR 16A has established 44,000 LSPs and supports a maximum of 50,000 LSPs. When LSI 22 is not supported, LER 12A would be unable to determine whether one of LSRs 16, such as LSR 16A, has established a maximum number of LSPs concurrently supported by the LSR 16. Therefore, in other systems, LER 12A may send requests to LSR 16A to establish additional LSPs, even though LSR 16A is approaching its maximum limit of established LSPs.

According to the techniques of the disclosure, LSR 16A generates a link state routing protocol message 20A that includes LSI 22A such as the currently established LSPs of LSR 16A (44,000) and the maximum number of LSPs (50,000). LSR 16A floods link state routing protocol message 20A across network system 10. LER 12A receives the link state routing protocol message 20A and updates the representation of the topology of network system 10 to associate LSR 16A with the LSI 22A included within link state routing protocol message 20A. LER 12A may receive additional link state protocol messages 20 from LSRs 16B-16N that include LSI 22B-22N, whereupon LER 12A may likewise update the representation of the topology to associate LSI 22B-22N with the node corresponding to the one of LSRs 16B-16N that sent link state routing protocol messages 22B-22N, respectively.

LER 12A may use LSI 22 stored to the representation of the topology to resolve the representation of the topology to select a path over which to establish an additional LSP based on LSI 22. For example, by using LSI 22A obtained from link state routing message 20A, LER 12A discovers that LSR 16A has established 44,000 LSPs and supports a maximum of 50,000 LSPs. In a similar fashion, by using LSI 22B obtained from link state routing message 20B, LER 12A discovers that LSR 16B has established 20,000 LSPs and supports a maximum of 60,000 LSPs, and, by using LSI 22C obtained from link state routing message 20C, LER 12A discovers that LSR 16C has established 30,000 LSPs and supports a maximum of 50,000 LSPs Based on this information, LER 12A may identify which of LSR 16 has a largest available capacity (which may be defined, as one example, as a maximum number of sessions (MAX) of each of LSIs 22 minus the corresponding currently established number of sessions (EST) of each of LSIs 22). In the example of FIG. 1, LER 12A may determine that LSR 16A has an available capacity of 6,000 LSPs (e.g., 50,000 minus 44,000), while LSR 16B has an available capacity of 40,000 LSPs (e.g., 60,000 minus 20,000) and LSR 16C has an available capacity of 20,000 LSPs (e.g., 50,000 minus 30,000).

In some examples, LER 12A stores the computed available capacity of each LSR 16 in a network graph, and updates the stored available capacity of each LSR 16 upon receiving new LSI 22 from a subsequent link state routing message 20.

Upon selecting an LSR 16 to establish a new LSP, LER 12A selects the LSR 16 having the highest available capacity in the network graph. In the example of FIG. 1, LER 12A may select LSR 16B, which has an available capacity of 40,000 LSPs, over LSR 16A and LSR 16C, which have an available capacity of 6,000 and 20,000 LSPs, respectively.

Thus, by using the available capacity computed via LSI 22 obtained through link state routing messages 20, LER 12A may load balance new LSPs across LSRs 16 such that fewer LSPs are concentrated on individual ones of LSRs 16, thereby reducing the likelihood of network congestion and the resulting dropping of packets that may result from overutilization of LSRs 16.

Although described above with respect to an available capacity, the load balancing aspects of the techniques may be performed with respect to the number of currently established sessions (EST) of each of LSIs 22. In this example, upon selecting an LSR 16 to establish a new LSP, LER 12A selects the selects the one of LSRs 16 having a lowest number of currently established sessions. With respect to FIG. 1, LER 12A may select LSR 16B, which has established 20,000 LSPs, over LSR 16A and LSR 16C, which have established 44,000 and 30,000 LSPs, respectively. Thus, by discovering, through link state routing messages 20, the LSR 16 that has established the lowest number of LSPs, any by using this LSR 16 to establish subsequent LSPs, LER 12A may load balance new LSPs across LSRs 16 such that less LSPs are concentrated on individual ones of LSRs 16, thereby reducing the likelihood of network congestion and the resulting dropping of packets that may result from overutilization of LSRs 16.

Likewise, the load balancing aspects of the techniques may be performed with respect to the one of LSRs 16 having a highest max number of concurrent sessions (MAX) specified by each of LSIs 22, or any combination of the foregoing in which multiple different criteria are utilized when performing the load balancing aspects of the techniques described in this disclosure. Further, LER 12A may further incorporate other constraints on the selection of an LSR 16 to establish a new LSP, such as requirements for maximum path lengths, permitted types of data, minimum response times, etc.

In further examples, LSR 16A may assign groups of LSPs to different priorities to allocate different amounts of bandwidth and resources to the different groups of LSPs. For example, LSR 16A may associate 20,000 LSPs of a maximum of 50,000 LSPs to a priority of "0," and LSR 16A may further associate 30,000 LSPs of the maximum of 50,000 LSPs to a priority of "1." Thus, LSR 16A may assign different types of network traffic (e.g., Voice over Internet Protocol ("VoIP"), data traffic) to different LSPs such that the different types of network traffic receive different bandwidth, pathing, or routing requirements to comply with service agreements of the customers of the service provider network. LSR 16A may include this information in the LSI 22A of link state routing protocol message 20A, and flood this information to ingress routers, such as LERs 12A-12B.

Although not shown in the example of FIG. 1, LSRs 16 may specify LSI 22 in link state routing protocol messages 20 according to priorities of established LSPs. That is, in the example of FIG. 1, LER 12A may resolve the representation of the topology to select a path over which to establish an LSP based on the LSI 22A from LSR 16A and the priority level of the LSP. In one example, the LSI may include a plurality of priorities, and for each priority, include a highest max number of concurrent LSPs (MAX) for the priority and a concurrently established number of LSPs (EST) for the priority.

LER 12A may use LSI 22 stored to the representation of the topology to resolve the representation of the topology to select a path over which to establish an additional LSP based on LSI 22. For example, by using LSI 22A obtained from link state routing message 20A, LER 12A discovers that LSR 16A has established 44,000 LSPs and supports a maximum of 50,000 LSPs. LER 12A further discovers from LSI 22A that LSR 16A supports two priorities, priorities "0" and "1," and that LSR 16A has established 28,000 LSPs associated with priority "0" and supports a maximum of 30,000 LSPs associated with priority "0," and that LSR 16A has established 16,000 LSPs associated with priority "1" and supports a maximum of 20,000 LSPs associated with priority "1."

In a similar fashion, by using LSI 22B obtained from link state routing message 20B, LER 12A discovers that LSR 16B has established 20,000 LSPs and supports a maximum of 60,000 LSPs. LER 12A further discovers from LSI 22B that LSR 16B supports two priorities, priorities "0" and "1," and that LSR 16B has established 9,000 LSPs associated with priority "0" and supports a maximum of 20,000 LSPs associated with priority "0," and that LSR 16B has established 11,000 LSPs associated with priority "1" and supports a maximum of 40,000 LSPs associated with priority "1."

Based on this information, LER 12A may identify which of LSR 16 has a largest available capacity (which may be defined, for each priority, as one example, as a maximum number of sessions (MAX) of each of LSIs 22 minus the corresponding currently established number of sessions (EST) of each of LSIs 22). In the example of FIG. 1, LER 12A may determine that, for priority "0," LSR 16A has an available capacity of 2,000 LSPs (e.g., 30,000 minus 28,000), while LSR 16B has an available capacity of 11,000 LSPs (e.g., 20,000 minus 9,000). Similarly, LER 12A may determine that, for priority "1," LSR 16A has an available capacity of 4,000 LSPs (e.g., 20,000 minus 16,000), while LSR 16B has an available capacity of 29,000 LSPs (e.g., 40,000 minus 11,000). In some examples, LER 12A stores, for each priority, the computed available capacity of each LSR 16 in a network graph, and updates the stored available capacity of each LSR 16 for each priority upon receiving new LSI 22 from a subsequent link state routing message 20.

Upon selecting an LSR 16 to establish a new LSP, LER 12A selects the LSR 16 having the highest available capacity for the applicable priority in the network graph. In the example of FIG. 1, to establish a new LSP having a priority of "0," LER 12A may select LSR 16B, which has an available capacity of 11,000 LSPs for priority "0," over LSR 16A, which has an available capacity of 6,000 LSPs for priority "0." Similarly, to establish a new LSP having a priority of "1," LER 12A may again select LSR 16B, which has an available capacity of 29,000 LSPs for priority "1," over LSR 16A, which has an available capacity of 4,000 LSPs for priority "1." Thus, by using the available capacity computed via LSI 22 obtained through link state routing messages 20, LER 12A may load balance new LSPs across LSRs 16 according to different priorities such that less LSPs are concentrated on individual ones of LSRs 16, thereby reducing the likelihood of network congestion and the resulting dropping of packets that may result from overutilization of LSRs 16.

While in the above examples, LER 12A selects an LSR 16 based on the highest available capacity for the required priority, the load balancing aspects of the techniques may be performed with respect to the one of LSRs 16 having a lowest number of currently established sessions for the required priority, or the one of LSRs 16 having a highest max number of concurrent sessions (MAX) for the required priority, as specified by each of LSIs 22, or any combination of the foregoing in which multiple different criteria are utilized when performing the load balancing aspects of the techniques described in this disclosure. Further, LER 12A may further incorporate other constraints on the selection of an LSR 16 to establish a new LSP, such as requirements for maximum path lengths, permitted types of data, minimum response times, etc.

Accordingly, an enhanced, flooding-based routing protocol is described that allows routers of network 14 to exchange LSI 22 with one another. The techniques may allow conventional flooding-based routing protocols to be used to specify, as LSI 22, a number of LSPs supported by an intermediately positioned LSR (e.g., LSRs 16A-16C), which may also be referred to as a transit router. Such LSI 22 may allow ingress routers, such as LER 12A, that act as an ingress to an LSP, to better identify which LSRs are available to support new LSPs, while also enabling load balancing of LSPs amongst the LSRs. Furthermore, different vendors or types of LSRs may support different numbers of LSPs, and the LSI 22 may allow LERs to avoid overloading those LSRs that support fewer numbers of LSPs.

FIG. 2A is a block diagram illustrating an example encoding of LSI 45 described herein for the IS-IS routing protocol. In general, an IS-IS link state PDU is composed of a fixed header and a number of tuples, each consisting of a Type, a Length, and a Value (TLV). In the example of FIG. 2, TLV 40 includes a TYPE field 42, a LENGTH field 44, and a VALUE field 45 that is partitioned into a MAX sub-field 46 and an ESTABLISHED sub-field 48.

TYPE field 42 has a length of one octet that specifies a unique identifier for the new TLV defined herein for carrying LSI (LSI). LENGTH field 44 has a length of one octet, and indicates a length of VALUE field 45. MAX sub-field 46 has a length of at least one octet and specifies a maximum number of LSPs concurrently supported by the transit router (e.g., LSR 16A). ESTABLISHED sub-field 48 has a length of at least one octet and specifies a number of LSPs concurrently established by the transit router (e.g., LSR 16A) and for which the transit router is responsible for switching packets to one or more of the two label edge routers (e.g., LERs 12A-12B).

FIG. 2B is a block diagram illustrating another example encoding of LSI 46 described herein for the IS-IS routing protocol. In general, an IS-IS link state PDU is composed of a fixed header and a number of tuples, each consisting of a Type, a Length, and a Value (TLV). In the example of FIG. 2, TLV 41 includes a TYPE field 42, a LENGTH field 44, and a VALUE field 47 that is partitioned into three levels, 0, 1, and 2, wherein each priority level includes a MAX sub-field 46 and an ESTABLISHED sub-field 48. TYPE field 42 and LENGTH field 44 function in a substantially similar fashion to TYPE field 42 and LENGTH field 44 of FIG. 2A.

MAX sub-field 46-0 has a length of at least one octet and specifies a maximum number of LSPs concurrently supported by the transit router (e.g., LSR 16A) for a first priority (e.g., priority level 0). ESTABLISHED sub-field 48-0 has a length of at least one octet and specifies a number of LSPs concurrently established by the transit router (e.g., LSR 16A) for the first priority and for which the transit router is responsible for switching packets to one or more of the two label edge routers (e.g., LERs 12A-12B).

MAX sub-field 46-1 has a length of at least one octet and specifies a maximum number of LSPs concurrently supported by the transit router (e.g., LSR 16A) for a second priority (e.g., priority level 1). ESTABLISHED sub-field 48-1 has a length of at least one octet and specifies a number of LSPs concurrently established by the transit router (e.g., LSR 16A) for the second priority and for which the transit router is responsible for switching packets to one or more of the two label edge routers (e.g., LERs 12A-12B).

MAX sub-field 46-2 has a length of at least one octet and specifies a maximum number of LSPs concurrently supported by the transit router (e.g., LSR 16A) for a third priority (e.g., priority level 2). ESTABLISHED sub-field 48-2 has a length of at least one octet and specifies a number of LSPs concurrently established by the transit router (e.g., LSR 16A) for the third priority and for which the transit router is responsible for switching packets to one or more of the two label edge routers (e.g., LERs 12A-12B).

Although not depicted in FIG. 2B, VALUE field 45 may further include a TOTAL MAX field that specifies a maximum number of LSPs concurrently supported by the transit router across all priorities (e.g., a total maximum number of LSPs). VALUE field 45 may further include a TOTAL ESTABLISHED field that specifies a number of LSPs concurrently established by the transit router across all priorities (e.g., a total number of established LSPs.)

Accordingly, LSR 16A may assign groups of LSPs to different priorities to allocate different amounts of bandwidth and resources to the different groups of LSPs. Furthermore, LSR 16A may assign, for each priority level, different maximum numbers of concurrent LSPs. LSR 16A may further exchange this information with ingress routers, such as LERs 12A-12B, such that LERs 12A-12B may resolve the representation of the topology to select a path over which to establish an LSP based on the LSI from LSR 16A and the priority level of the LSP.

Figure 2C:
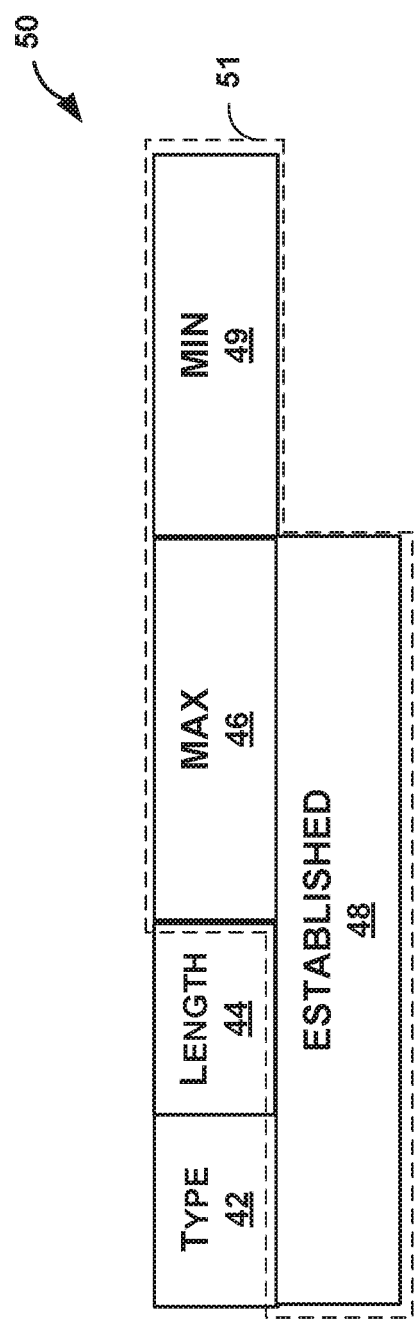
FIG. 2C is a block diagram illustrating another example encoding of LSI as described herein for the IS-IS routing protocol.

FIG. 2C is a block diagram illustrating another example encoding of LSI 50 described herein for the IS-IS routing protocol. In general, an IS-IS link state PDU is composed of a fixed header and a number of tuples, each consisting of a Type, a Length, and a Value (TLV). In the example of FIG. 2, TLV 50 includes a TYPE field 42, a LENGTH field 44, and a VALUE field 51 that is partitioned into a MAX sub-field 46, a MIN sub-field 49, and an ESTABLISHED sub-field 48.

TYPE field 42 has a length of one octet that specifies a unique identifier for the new TLV defined herein for carrying LSI (LSI). LENGTH field 44 has a length of one octet, and indicates a length of VALUE field 51. MAX sub-field 46 has a length of at least one octet and specifies a maximum number of LSPs concurrently supported by the transit router (e.g., LSR 16A). MIN sub-field 47 has a length of at least one octet and specifies a minimum number of LSPs required to be concurrently established by the transit router (e.g., LSR 16A). ESTABLISHED sub-field 48 has a length of at least one octet and specifies a number of LSPs concurrently established by the transit router (e.g., LSR 16A) and for which the transit router is responsible for switching packets to one or more of the two label edge routers (e.g., LERs 12A-12B).

Figure 3A:
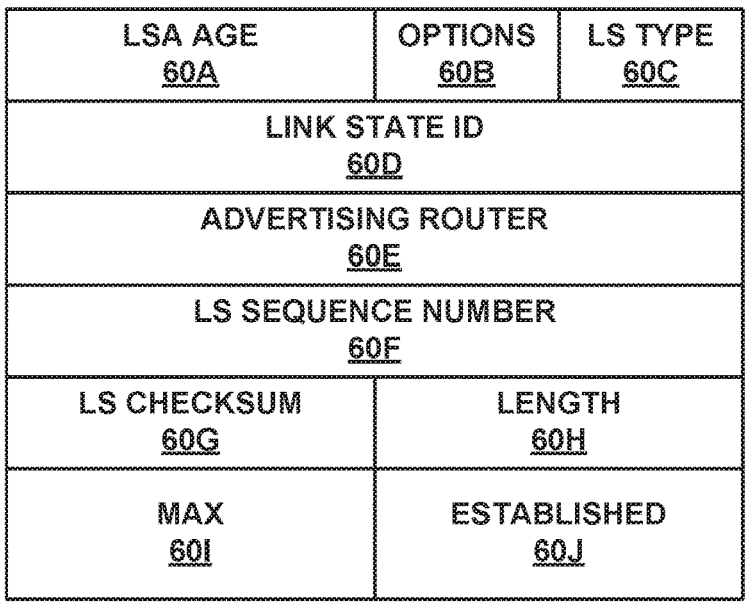
FIG. 3A is an example of a link state message header for specifying LSI described herein.

FIG. 3A is an example of a link state message header 58 for specifying LSI described herein. Link state message header 58, as shown in the exemplary embodiment of FIG. 3A, complies with the OSPF protocol in that it adheres to the four byte width limitation specified by the OSPF protocol. That is, link state message header 58 comprises a set of four-byte rows, as reflected in FIG. 3A by the 0-31 bit range for each row shown at the top of header 58. Further details of the format of OSPF link state messages can be found in RFC 2328, Internet Engineering Task Force (IETF), April, 1998 herein incorporated by reference.

As shown in FIG. 3A, link state message header 58 comprises a link state message age field 60A, options field 60B, LS type field 60C, link state identifier field 60D ("link state ID 60D"), advertising router field 60E, link state sequence number field 60F, link state checksum field 60G, length field 60H, a max number of LSP sessions 60I ("MAX 60I"), and an established number of LSP sessions 60J ("ESTABLISHED 60J"). Although shown as contain fields 60A-60J ("fields 60"), link state message header 58 may contain more or less fields 60 shown in FIG. 3A so long as link state message header 58 comprises MAX field 60I and ESTABLISHED field 60J.

LS age field 60A typically specifies the age of the link state message bearing link state message header 58 in seconds and is used to distinguish between two link state messages specifying the same link state message sequence number in their respective LS sequence number field 60F. Options field 60B may specify which optional capabilities are associated with the link state message bearing link state message header 58.

LS type field 60C indicates the format and function of the link state message bearing link state message header 58, i.e., the type of link state message. If LS type field 60C stores a "1," for example, the link state message associated with link state message header 58 is designated as a router link state message. Alternatively, if LS type field 60C stores a "2," the link state message defined by link state message header 58 is determined to be a network link state message. LS type field 60C is used herein to indicate that the link state message is a flow-control type used to convey burst-rate and average-rate control information by specifying a different identifier not currently used to define an existing link state message type.

Link state ID field 60D typically identifies a portion of the routing domain that is being described by the link state message bearing link state message header 58. Advertising router field 60E may specify the OSPF router identifiers of the link state message's originator. LS sequence number field 60F may comprise a signed 32-bit integer used to detect old and duplicate link state messages. LS checksum field 60G may indicate whether the link state message accompanying link state message header 58 contains errors, and OSPF modules 44 may employ LS checksum field 60G to discard possibly faulty link state messages. Length field 60H indicates the length of link state message header 58.

MAX field 60I is a newly defined field that extends OSPF to specify at least a portion of LSI described in this disclosure. MAX field 60I has a length of at least one octet and specifies a maximum number of LSPs concurrently supported by the transit router (e.g., LSR 16A).

ESTABLISHED field 60J is a newly defined field that extends OSPF to specify at least a portion of LSI described in this disclosure. ESTABLISHED field 60J has a length of at least one octet and specifies a number of LSPs concurrently established by the transit router (e.g., LSR 16A) and for which the transit router is responsible for switching packets to one or more of the two label edge routers (e.g., LERs 12A-12B).

Figure 3B:
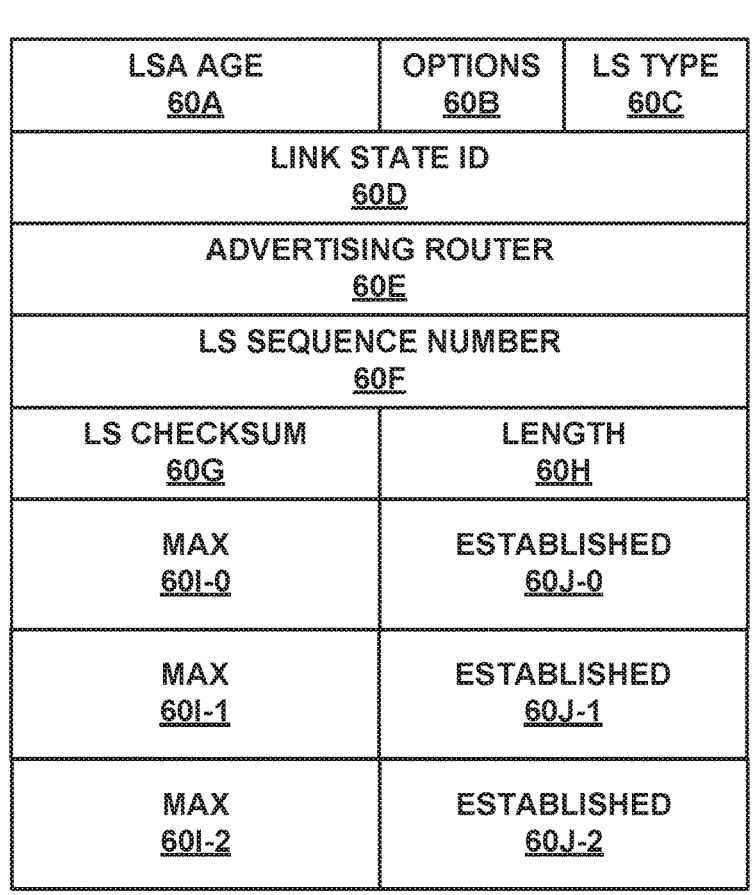
FIG. 3B is another example of a link state message header for specifying LSI described herein.

FIG. 3B is another example of a link state message header 59 for specifying LSI described herein. As shown in FIG. 3B, link state message header 59 comprises an link state message age field 60A, options field 60B, LS type field 60C, link state identifier field 60D ("link state ID 60D"), advertising router field 60E, link state sequence number field 60F, link state checksum field 60G, and length field 60H, each of which may function in a substantially similar fashion to the like fields of FIG. 3A.

Link state message header 59 further comprises, for a plurality of priority levels, a max number of LSP sessions 60I (e.g., "MAX 60I-0," "MAX 60I-1," and "MAX 60I-2"), and an established number of LSP sessions 60J (e.g., "ESTABLISHED 60J-0," "ESTABLISHED 60J-1," and "ESTABLISHED 60J-2"). Although shown as contain fields 60A-60J ("fields 60"), link state message header 58 may contain more or less fields 60 shown in FIG. 3A so long as link state message header 58 comprises MAX field 60I and ESTABLISHED field 60J.

MAX field 60I-0 is a newly defined field that extends OSPF to specify at least a portion of LSI described in this disclosure. MAX field 60I-0 has a length of at least one octet and specifies a maximum number of LSPs concurrently supported by the transit router (e.g., LSR 16A) for a first priority level (e.g., priority level 0).

ESTABLISHED field 60J-0 is a newly defined field that extends OSPF to specify at least a portion of LSI described in this disclosure. ESTABLISHED field 60J-0 has a length of at least one octet and specifies a number of LSPs concurrently established by the transit router (e.g., LSR 16A) for the first priority level and for which the transit router is responsible for switching packets to one or more of the two label edge routers (e.g., LERs 12A-12B).

MAX field 60I-1 is a newly defined field that extends OSPF to specify at least a portion of LSI described in this disclosure. MAX field 60I-1 has a length of at least one octet and specifies a maximum number of LSPs concurrently supported by the transit router (e.g., LSR 16A) for a second priority level (e.g., priority level 1).

ESTABLISHED field 60J-1 is a newly defined field that extends OSPF to specify at least a portion of LSI described in this disclosure. ESTABLISHED field 60J-1 has a length of at least one octet and specifies a number of LSPs concurrently established by the transit router (e.g., LSR 16A) for the second priority level and for which the transit router is responsible for switching packets to one or more of the two label edge routers (e.g., LERs 12A-12B).

MAX field 60I-2 is a newly defined field that extends OSPF to specify at least a portion of LSI described in this disclosure. MAX field 60I-2 has a length of at least one octet and specifies a maximum number of LSPs concurrently supported by the transit router (e.g., LSR 16A) for a third priority level (e.g., priority level 2).

ESTABLISHED field 60J-2 is a newly defined field that extends OSPF to specify at least a portion of LSI described in this disclosure. ESTABLISHED field 60J-2 has a length of at least one octet and specifies a number of LSPs concurrently established by the transit router (e.g., LSR 16A) for the third priority level and for which the transit router is responsible for switching packets to one or more of the two label edge routers (e.g., LERs 12A-12B).

Accordingly, LSR 16A may assign groups of LSPs to different priorities to allocate different amounts of bandwidth and resources to the different groups of LSPs. Furthermore, LSR 16A may assign, for each priority level, different maximum numbers of concurrent LSPs. LSR 16A may further exchange this information with ingress routers, such as LERs 12A-12B, such that LERs 12A-12B may resolve the representation of the topology to select a path over which to establish an LSP based on the LSI from LSR 16A and the priority level of the LSP.

Figure 3C:
FIG. 3C is another example of a link state message header for specifying LSI described herein.

FIG. 3C is another example of a link state message header 61 for specifying LSI described herein. As shown in FIG. 3C, link state message header 61 comprises a link state message age field 60A, options field 60B, LS type field 60C, link state identifier field 60D ("link state ID 60D"), advertising router field 60E, link state sequence number field 60F, link state checksum field 60G, and length field 60H, each of which may function in a substantially similar fashion to the like fields of FIG. 3A.

MAX field 60I is a newly defined field that extends OSPF to specify at least a portion of LSI described in this disclosure. MAX field 60I has a length of at least one octet and specifies a maximum number of LSPs concurrently supported by the transit router (e.g., LSR 16A).

MIN field 60K is a newly defined field that extends OSPF to specify at least a portion of LSI described in this disclosure. MIN field 60K has a length of at least one octet and specifies a minimum number of LSPs required to be concurrently established by the transit router (e.g., LSR 16A).

ESTABLISHED field 60J is a newly defined field that extends OSPF to specify at least a portion of LSI described in this disclosure. ESTABLISHED field 60J has a length of at least one octet and specifies a number of LSPs concurrently established by the transit router (e.g., LSR 16A) and for which the transit router is responsible for switching packets to one or more of the two label edge routers (e.g., LERs 12A-12B).

Figure 4:
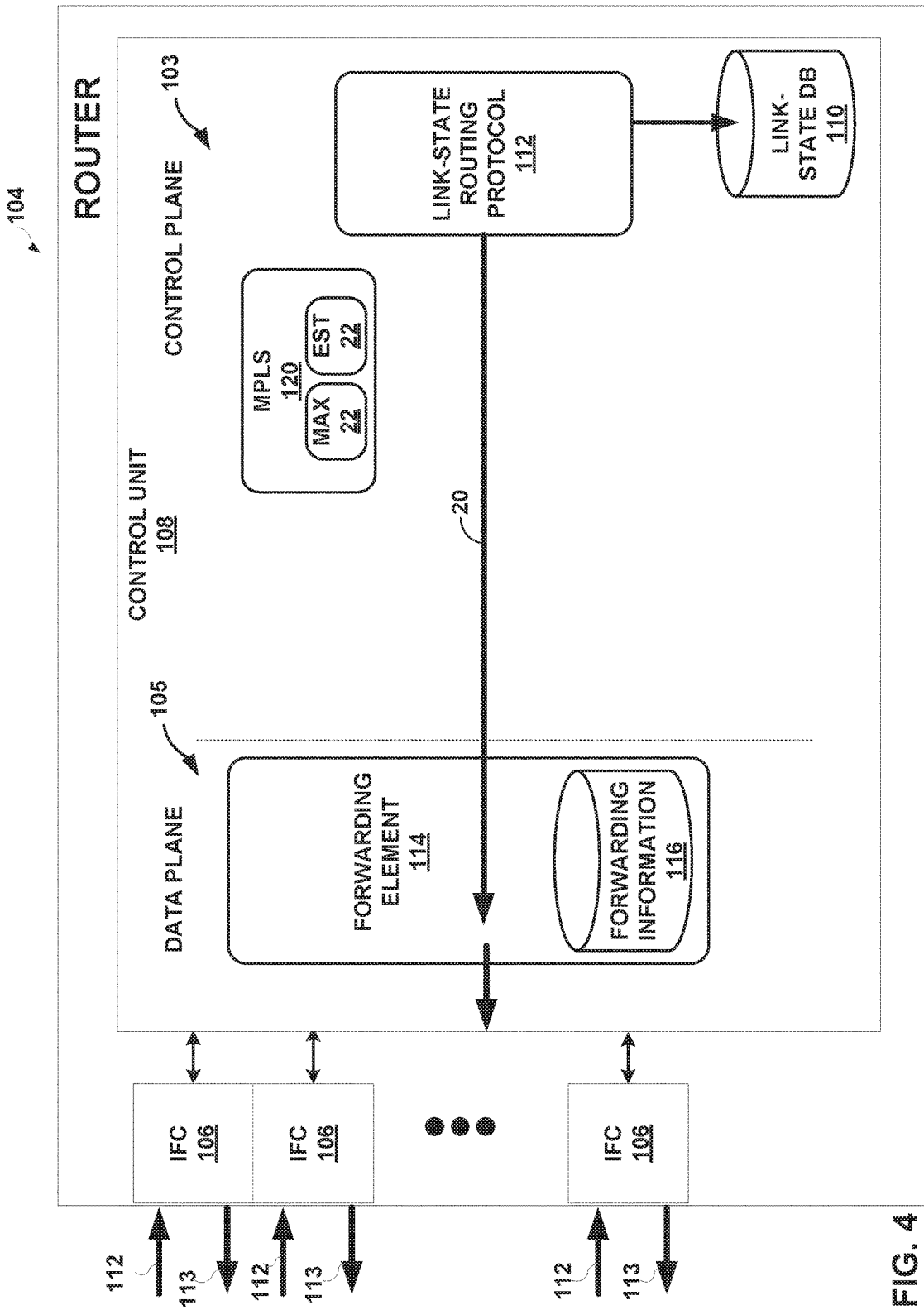
FIG. 4 is a block diagram illustrating an example router configured to perform various aspects of the techniques described in this disclosure.

FIG. 4 is a block diagram illustrating an example router 104 configured to perform various aspects of the techniques described in this disclosure. Router 104 may, for example, represent any of routers 12 and 16 of FIG. 1. In the case where router 104 is a transit router, such as one of routers LSR 16A-16C, router 104 is configured to generate a link state routing protocol message 20 including LSI 22 and flood the link state routing protocol message 20 to LERs 12. Similarly, in the case where router 104 is an ingress router, such as one of LERs 12A-12B, router 104 is configured to receive the link state routing protocol message 20 and update a representation of the network topology to select a path over which to establish an LSP based on the LSI 22 contained within link state routing protocol message 20.

In the example of FIG. 4, router 104 includes one or more interface cards (IFCs) 106 for sending and receiving packets using network links 112 and 113. IFCs 106 are typically coupled to network links 112, 113 via a number of physical interface ports. In general, router 104 receives inbound packets from network links 112, determines destinations for the received packets, and outputs the packets on network links 113 based on the destinations. In this way, network links 112, 113 provide L2 communications media for transmitting packets. Any of network links 112, 113 may be multi-access media, such as an Ethernet network, or point-to-point media such as optical connections.

In general, router 104 may be thought of as having a control unit 108 that provides a control plane 103 and a data plane 105. Control plane 103 is primarily responsible for maintaining a link-state database (DB) 110 to reflect the current link state data of the flooding domain established by way of link state routing protocol 112. For example, routing engine 68 provides an operating environment for execution of link-state routing protocol 112 that communicate with peer routers and periodically update link state DB 110 to accurately reflect the link state of the flooding domain (e.g., which is represented by network 15 in the example of FIG. 1, and as such may be referred to as flooding domain 14) within which router 104 operates. Again, examples of protocol 112 may include routing and label switching protocols, such as IS-IS and OSPF.

In accordance with link state DB 110, forwarding element 114 maintains forwarding information 116 that associates network destinations or other keying information with specific next hops and corresponding interface ports of output interface cards 106 of router 108. Control plane 103 typically processes link state DB 110 to perform route selection and generate forwarding information 116 based on selected routes. In this way, forwarding information may be programmed into data plane 105. Control plane 103 may generate forwarding information 116 in the form of a table, list, radix tree or other data structure. U.S. Pat. No. 7,184,437 provides details on an exemplary embodiment of a router that utilizes a radix tree for route resolution, the contents of which is incorporated herein by reference in its entirety.

When forwarding a transient packet, forwarding element 114 traverses forwarding information 116 based on keying information within a header of the packet to ultimately select a next hop and output interface to which to forward the packet. Based on the selection, forwarding element 114 may output the packet directly to the output interface or, in the case of a multi-stage switch fabric of a high-end router, may forward the packet to subsequent stages for switching to the proper output interface. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference. The invention is not limited to this architecture. In other embodiments, router 104 may be configured in a variety of ways. In one embodiment, for example, all or portions of control plane 103 and data plane 105 may be replicated and incorporated directly within IFCs 106.

In the context of a transport network executing MPLS, control plane 103 may also execute MPLS protocols by which to establish LSPs. MPLS 120 may interface with link-state routing protocol 112 to identify paths over which LSPs may be established. MPLS 120 may provide a destination LER to which an LSP is to be terminated to link-state routing protocol 112. Link-state routing protocol 112 may access link-state database 110 to resolve the topology to identify one of paths 18.

As described herein, link state routing protocol 112 is a flooding-based communications protocol that has been extended in the manner described herein to allow for LSI 22 to be added to link state database 110 and thereby facilitate selection of one of paths 18 over which to establish an LSP to LER 12B.

In one example, router 104 is a transit router, such as one of routers LSR 16A-16C. In this example, control unit 108 of LSR 16A determines a maximum number of LSPs concurrently supported by link-state database 110 of router 104 (e.g., 50,000 LSPs.). Further, control unit 108 determines a number of LSPs that link-state database 110 has concurrently established and for which router 104 is responsible for switching packets to one or more of LERs 12A-12B. Control unit 108 of LSR 16A generates, in accordance with a link state routing protocol 112, a link state routing protocol message 20A that specifies the LSI 22A as a maximum number of LSPs and the number of LSPs concurrently established within link-state database 110. In some examples, the link state routing protocol message 20A further specifies the LSI 22A as a minimum number of LSPs established within link-state database 110. In some examples, the link state routing protocol is OSPF. In other examples, the link state routing protocol is IS-IS.

Control unit 108 of LSR 16A floods, via IFCs 106 of forwarding element 114, the link state routing protocol message 20A to LERs 16A-16B. In some examples, control unit 109 determines when the number of LSPs 18 concurrently established within link-state database 110 exceeds a predetermined threshold (e.g., 5%, 10%, 25%, 50%, 75%, 90%, 95%, or 99%). Upon determining that the number of LSPs concurrently established within link-state database 110 exceeds the predetermined threshold, control unit 108 floods the link state routing protocol message 20A to LERs 16A-16B. In other examples, control unit 108 of LSR 16A floods the link state routing protocol message 20A to LERs 16A-16B upon receiving a request from one of LERs 16A-16B to establish a new LSP.

In further examples, control unit 108 of LSR 16A assigns groups of LSPs to different priorities to allocate different amounts of bandwidth and resources to the different groups of LSPs. For example, control unit 108 of LSR 16A may associate 20,000 LSPs of a maximum of 50,000 LSPs to a priority of "0," and control unit 108 of LSR 16A may further associate 30,000 LSPs of the maximum of 50,000 LSPs to a priority of "1." Thus, control unit 108 of LSR 16A may assign different types of network traffic (e.g., Voice over Internet Protocol ("VoIP"), data traffic) to different LSPs such that the different types of network traffic receive different bandwidth, pathing, or routing requirements to comply with service agreements of the customers of the service provider network. Control unit 108 of LSR 16A may include this information in the LSI 22A of link state routing protocol message 20A, and flood this information to ingress routers, such as LERs 12A-12B.

In another example, router 104 is an ingress router, such as one of routers LER 12A-12B. In this example, control unit 108 receives, via IFCs 106 of forwarding element 114, the link state routing protocol message 20A from LSR 16A. In response to receiving the link state routing protocol message 20A, control unit 108 of LER 12A updates a representation of a topology of the network 14 within forwarding information 116 to associate LSR 16A with the LSI 22A contained within link state routing protocol message 20A. Further, control unit 108 of LER 12A resolves the representation of the topology to select a path over which to establish an LSP based on the LSI 22A. Control unit 108 of LER 12A additionally establishes the LSP over the selected path and forwards network packets via the LSP. For example, by using the LSI 22A within link state routing message 20A, control unit 108 of LER 12A discovers that LSR 16A has established 44,000 LSPs and supports a maximum of 50,000 LSPs. Based on this LSI 22A, control unit 108 of LER 12A may determine that LSR 16A currently has an available capacity of 6,000 LSPs (e.g., 50,000-44,000).

In a similar fashion, control unit 108 receives, via IFCs 106 of forwarding element 114, a link state routing protocol message 20B from LSR 16B. In response to receiving the link state routing protocol message 20B, control unit 108 of LER 12A updates a representation of a topology of the network 14 within forwarding information 116 to associate LSR 16B with the LSI 22B contained within link state routing protocol message 20B. By using the LSI 22B within link state routing message 20B, control unit 108 of LER 12A discovers that LSR 16B has established 20,000 LSPs and supports a maximum of 60,000 LSPs. Based on this LSI 22B, control unit 108 of LER 12A may determine that LSR 16B currently has an available capacity of 40,000 LSPs (e.g., 60,000-20,000).

Upon selecting an LSR 16 to establish a new LSP, LER 12A selects the LSR 16 having the highest available capacity in the network graph. In above example, control unit 108 of LER 12A may select LSR 16B, which has an available capacity of 40,000 LSPs, over LSR 16A, which has an available capacity of 6,000. Thus, by using the available capacity computed via LSI 22 obtained through link state routing messages 20, LER 12A may load balance new LSPs across LSRs 16 such that fewer LSPs are concentrated on individual ones of LSRs 16, thereby reducing the likelihood of network congestion and the resulting dropping of packets that may result from overutilization of LSRs 16.

While in the above examples, control unit 108 of LER 12A selects an LSR 16 based on the highest available capacity for the required priority, the load balancing aspects of the techniques may be performed with respect to the one of LSRs 16 having a lowest number of currently established sessions for the required priority, or the one of LSRs 16 having a highest max number of concurrent sessions (MAX) for the required priority, as specified by each of LSIs 22, or any combination of the foregoing in which multiple different criteria are utilized when performing the load balancing aspects of the techniques described in this disclosure. Further, control unit 108 of LER 12A may further incorporate other constraints on the selection of an LSR 16 to establish a new LSP, such as requirements for maximum path lengths, permitted types of data, minimum response times, etc.

In some examples, the link state routing protocol message 20A indicates that the number of LSPs concurrently established by LSR 16A is substantially equal to a predetermined threshold (e.g., 90%, 95%, 99%) of the maximum number of LSPs. In response to receiving such a link state routing protocol message, control unit 108 resolves the representation of the topology within forwarding information 116 to select a path over which to establish an LSP based on the LSI, wherein the path does not include the transit router (e.g., LSR 16A). In other words, upon receiving a link state routing protocol message indicating that LSR 16A has concurrently established a number of LSPs approaching the maximum number of LSPs supported by LSR 16A (or exceeding a predetermined threshold number of LSPs), control unit 108, via forwarding element 114, selects a path that does not include LSR 16A. In this manner, control unit 108 of LER 12A may avoid sending requests to LSR 16A to establish additional LSPs when LSR 16A may not have the capability to do so.

In the above example wherein LSR 16A assigns priorities to different groups of LSPs, control unit 108 of LER 12A may resolve the representation of the topology to select a path over which to establish an LSP based on both the LSI from LSR 16A and the priority level of the LSP. For example, by using LSI 22A obtained from link state routing message 20A, control unit 108 of LER 12A discovers that LSR 16A has established 44,000 LSPs and supports a maximum of 50,000 LSPs. Control unit 108 of LER 12A further discovers from LSI 22A that LSR 16A supports two priorities, priorities "0" and "1," and that LSR 16A has established 28,000 LSPs associated with priority "0" and supports a maximum of 30,000 LSPs associated with priority "0," and that LSR 16A has established 16,000 LSPs associated with priority "1" and supports a maximum of 20,000 LSPs associated with priority "1."

In a similar fashion, by using LSI 22B obtained from link state routing message 20B, control unit 108 of LER 12A discovers that LSR 16B has established 20,000 LSPs and supports a maximum of 60,000 LSPs. Control unit 108 of LER 12A further discovers from LSI 22B that LSR 16B supports two priorities, priorities "0" and "1," and that LSR 16B has established 9,000 LSPs associated with priority "0" and supports a maximum of 20,000 LSPs associated with priority "0," and that LSR 16B has established 11,000 LSPs associated with priority "1" and supports a maximum of 40,000 LSPs associated with priority "1."

Based on this information, control unit 108 of LER 12A may identify which of LSR 16 has a largest available capacity (which may be defined, for each priority, as one example, as a maximum number of sessions (MAX) of each of LSIs 22 minus the corresponding currently established number of sessions (EST) of each of LSIs 22). For example, control unit 108 of LER 12A may determine that, for priority "0," LSR 16A has an available capacity of 2,000 LSPs (e.g., 30,000 minus 28,000), while LSR 16B has an available capacity of 11,000 LSPs (e.g., 20,000 minus 9,000). Similarly, control unit 108 of LER 12A may determine that, for priority "1," LSR 16A has an available capacity of 4,000 LSPs (e.g., 20,000 minus 16,000), while LSR 16B has an available capacity of 29,000 LSPs (e.g., 40,000 minus 11,000). In some examples, control unit 108 of LER 12A stores, for each priority, the computed available capacity of each LSR 16 in a network graph, and updates the stored available capacity of each LSR 16 for each priority upon receiving new LSI 22 from a subsequent link state routing message 20.

Upon selecting an LSR 16 to establish a new LSP, control unit 108 of LER 12A selects the LSR 16 having the highest available capacity for the applicable priority in the network graph. In the foregoing example, to establish a new LSP having a priority of "0," control unit 108 of LER 12A may select LSR 16B, which has an available capacity of 11,000 LSPs for priority "0," over LSR 16A, which has an available capacity of 6,000 LSPs for priority "0." Similarly, to establish a new LSP having a priority of "1," control unit 108 of LER 12A may again select LSR 16B, which has an available capacity of 29,000 LSPs for priority "1," over LSR 16A, which has an available capacity of 4,000 LSPs for priority "1." Thus, by using the available capacity computed via LSI 22 obtained through link state routing messages 20, control unit 108 of LER 12A may load balance new LSPs across LSRs 16 according to different priorities such that less LSPs are concentrated on individual ones of LSRs 16, thereby reducing the likelihood of network congestion and the resulting dropping of packets that may result from overutilization of LSRs 16.

Accordingly, an enhanced, flooding-based routing protocol is described that allows routers of network 14 to exchange LSI 22 with one another. The techniques may allow conventional flooding-based routing protocols to be used to specify, as LSI 22, a number of LSPs supported by an intermediately positioned LSR (e.g., LSRs 16A-16C), which may also be referred to as a transit router. Such LSI 22 may allow ingress routers, such as LER 12A, that act as an ingress to an LSP, to better identify which LSRs are available to support new LSPs, while also enabling load balancing of LSPs amongst the LSRs. Furthermore, different vendors or types of LSRs may support different numbers of LSPs, and the LSI 22 may allow LERs to avoid overloading those LSRs that support fewer numbers of LSPs.

Figure 5:
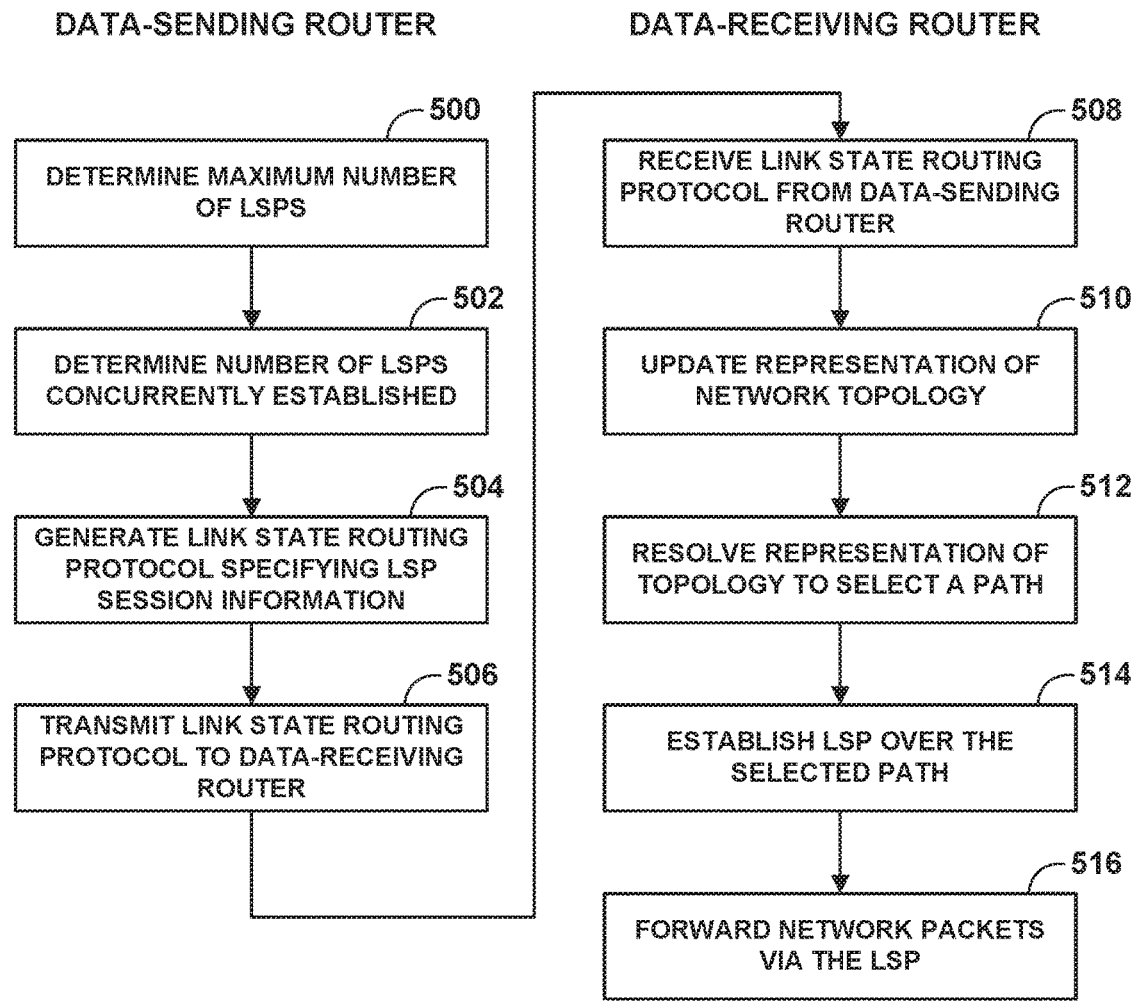
FIG. 5 is a flowchart illustrating example operation of a data-sending router and a data-receiving router that utilize and enhanced flooding-based routing protocol in accordance with the principles described herein.

FIG. 5 is a flowchart illustrating example operation of a data-sending router and a data-receiving router that utilize and enhanced flooding-based routing protocol in accordance with the principles described herein. In the example of FIG. 5, the data-sending router is typically a transit router, such as one of LSRs 16A-16C, and is configured to generate a link state routing protocol message 20 and flood the link state routing protocol message 20 to LERs 12. Further, the data-receiving router is typically an ingress router, such as one of LERs 12A-12B, and is configured to receive the link state routing protocol message 20 and update a representation of the network topology to select a path over which to establish an LSP based on the LSI 22 contained within link state routing protocol message 20.

In accordance with the techniques described in this disclosure, the data-sending router (e.g., LSR 16A) determines a maximum number of LSPs concurrently supported by LSR 16A (e.g., 50,000 LSPs.) (500). Further, LSR 16A determines a number of LSPs that LSR 16A has concurrently established and for which LSR 16A is responsible for switching packets to one or more of LERs 12A-12B (502). LSR 16A generates, in accordance with a link state routing protocol, a link state routing protocol message 20A that specifies the LSI 22A as a maximum number of LSPs and the number of LSPs concurrently established (504). In some examples, the link state routing protocol message 20A further specifies the LSI 22A as a minimum number of LSPs 18 established by LSR 16A. In some examples, the link state routing protocol is OSPF. In other examples, the link state routing protocol is IS-IS.

LSR 16A floods the link state routing protocol message 20A to LERs 16A-16B (506). In some examples, LSR 16A determines when the number of LSPs that LSR 16A has concurrently established exceeds a predetermined threshold (e.g., 5%, 10%, 25%0, 50%, 75%, 90%, 95%, or 99%) of the maximum number of LSPs. Upon determining that the number of LSPs that LSR 16A has concurrently established exceeds the predetermined threshold, LSR 16A floods the link state routing protocol message 20A to LERs 16A-16B. In other examples, LSR 16A floods the link state routing protocol message 20A to LERs 16A-16B upon receiving a request from one of LERs 16A-16B to establish a new LSP.

In further examples, the data-receiving router (e.g., LER 12A), receives the link state routing protocol message 20A from LSR 16A (508). In response to receiving the link state routing protocol message 20A, LER 12A updates a representation of a topology of the network 14 to associate LSR 16A with the LSI (510). For example, and with respect to FIG. 1, by using LSI 22A obtained from link state routing message 20A, LER 12A discovers that LSR 16A has established 44,000 LSPs and supports a maximum of 50,000 LSPs. In a similar fashion, by using LSI 22B obtained from link state routing message 20B, LER 12A discovers that LSR 16B has established 20,000 LSPs and supports a maximum of 60,000 LSPs, and, by using LSI 22C obtained from link state routing message 20C, LER 12A discovers that LSR 16C has established 30,000 LSPs and supports a maximum of 50,000 LSPs Based on this information, LER 12A may identify which of LSR 16 has a largest available capacity (which may be defined, as one example, as a maximum number of sessions (MAX) of each of LSIs 22 minus the corresponding currently established number of sessions (EST) of each of LSIs 22). In the example of FIG. 1, LER 12A may determine that LSR 16A has an available capacity of 6,000 LSPs (e.g., 50,000 minus 44,000), while LSR 16B has an available capacity of 40,000 LSPs (e.g., 60,000 minus 20,000) and LSR 16C has an available capacity of 20,000 LSPs (e.g., 50,000 minus 30,000). In some examples, LER 12A stores the computed available capacity of each LSR 16 in a network graph, and updates the stored available capacity of each LSR 16 upon receiving new LSI 22 from a subsequent link state routing message 20.

Further, LER 12A resolves the representation of the topology to select a path over which to establish an LSP based on the LSI (512). For example, upon selecting an LSR 16 to establish a new LSP, LER 12A selects the LSR 16 having the highest available capacity in the network graph. In the example of FIG. 1, LER 12A may select LSR 16B, which has an available capacity of 40,000 LSPs, over LSR 16A and LSR 16C, which have an available capacity of 6,000 and 20,000 LSPs, respectively. Thus, by using the available capacity computed via LSI 22 obtained through link state routing messages 20, LER 12A may load balance new LSPs across LSRs 16 such that fewer LSPs are concentrated on individual ones of LSRs 16, thereby reducing the likelihood of network congestion and the resulting dropping of packets that may result from overutilization of LSRs 16. Upon determining the LSR 16 having the highest available capacity (e.g., LSR 16B), LER 12A selects a path through the appropriate LSR 16. LER 12A further establishes the LSP over the selected path (514).

While in the above examples, LER 12A selects an LSR 16 based on the highest available capacity, the load balancing aspects of the techniques may be performed with respect to the one of LSRs 16 having a lowest number of currently established sessions, or the one of LSRs 16 having a highest max number of concurrent sessions (MAX), as specified by each of LSIs 22, or any combination of the foregoing in which multiple different criteria are utilized when performing the load balancing aspects of the techniques described in this disclosure. Further, LER 12A may further incorporate other constraints on the selection of an LSR 16 to establish a new LSP, such as requirements for maximum path lengths, permitted types of data, minimum response times, etc.

Upon establishing the LSP over the selected path, LER 12 forwards network packets via the LSP (516). In some examples, the link state routing protocol message 20A indicates that the number of LSPs concurrently established by LSR 16A is has exceeded a predetermined threshold (e.g., 90%, 95%, 99%) of the maximum number of LSPs. In response to receiving such a link state routing protocol message, LER 12A resolves the representation of the topology to select a path over which to establish an LSP based on the LSI, wherein the path does not include the transit router. In other words, upon receiving a link state routing protocol message 20A indicating that LSR 16A has concurrently established a number of LSPs approximately equal to the maximum number of LSPs supported by LSR 16A, LER 12A selects a path that does not include LSR 16A. In this manner, LER 12A may avoid sending requests to LSR 16A to establish additional LSPs when LSR 16A may not have the capability to do so.

Accordingly, an enhanced, flooding-based routing protocol is described that allows routers 12, 16 of network 14 to exchange LSI with one another. The techniques may allow conventional flooding-based routing protocols to be used to specify, as LSI, a number of LSPs supported by an intermediately positioned LSR (e.g., LSRs 16A-16C), which may also be referred to as a transit router. Such LSI may allow ingress routers, such as LER 12A, that act as an ingress to an LSP, to better identify which LSRs are available to support new LSPs, while also enabling load balancing of LSPs amongst the LSRs. Furthermore, different vendors or types of LSRs may support different numbers of LSPs, and the LSI may allow LERs to avoid overloading those LSRs that support fewer numbers of LSPs.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method of transmitting label switched path (LSP) session information, the method comprising:

receiving, by a transit router intermediately positioned between at least two label edge routers and from one of the at least two label edge routers, a request to establish a first LSP; and in response to receiving the request to establish the first LSP:

determining, by the transit router, a maximum number of LSPs concurrently supported by the transit router;

determining, by the transit router, a number of LSPs concurrently configured by the transit router and for which the transit router is responsible for switching packets to one or more of the two label edge routers;

generating, by the transit router and in accordance with a link state routing protocol, a link state routing protocol message that specifies the LSP session information as the maximum number of LSP and the number of LSPs concurrently configured;

transmitting, by the transit router and to the label edge routers, the link state routing protocol message; and configuring, by the transit router, at least a portion of the first LSP.

2. The method of claim 1, further comprising determining whether the number of LSPs concurrently configured by the transit router and for which the transit router is responsible for switching packets to one or more of the two label edge routers is greater than a predetermined threshold, and wherein transmitting the link state routing protocol message comprises transmitting the link state routing protocol message upon determining that the number of LSPs concurrently configured by the transit router and for which the transit router is responsible for switching packets to one or more of the two label edge routers is greater than the predetermined threshold.

3. The method of claim 1, wherein determining a maximum number of LSPs concurrently supported by the transit router comprises:

determining a first maximum number of LSPs associated with a first priority; and determining a second maximum number of LSPs associated with a second priority;

wherein determining the number of LSPs concurrently configured by the transit router and for which the transit router is responsible for switching packets to one or more of the two label edge routers comprises:

determining the number of LSPs associated with the first priority and concurrently configured by the transit router and for which the transit router is responsible for switching packets to one or more of the two label edge routers; and determining the number of LSPs associated with the second priority and concurrently configured by the transit router and for which the transit router is responsible for switching packets to one or more of the two label edge routers; and wherein generating the link state routing protocol message comprises generating a link state routing protocol message that specifies the LSP session information as the first maximum number of LSPs and the number of LSPs concurrently configured and associated with the first priority and the second maximum number of LSP and the number of LSPs concurrently configured and associated with the second priority.

4. The method of claim 1, wherein generating the link state routing protocol message comprises generating a link state routing protocol message that specifies the LSP session information as a minimum number of LSPs, the maximum number of LSP, and the number of LSPs concurrently configured.

5. A transit router intermediately positioned between at least two label edge routers, the transit router configured to:

receive, from one of the at least two label edge routers, a request to establish a first LSP; and in response to receiving the request to establish the first LSP:

determine a maximum number of LSPs concurrently supported by the transit router;

determine a number of LSPs concurrently configured by the transit router and for which the transit router is responsible for switching packets to one or more of the two label edge routers;

generate, in accordance with a link state routing protocol, a link state routing protocol message that specifies the LSP session information as the maximum number of LSP and the number of LSPs concurrently configured;

transmit, to the label edge routers, the link state routing protocol message; and configure at least a portion of the first LSP.

6. The transit router of claim 5, wherein the transit router is further configured to:

determine whether the number of LSPs concurrently configured by the transit router and for which the transit router is responsible for switching packets to one or more of the two label edge routers is greater than a predetermined threshold; and transmit the link state routing protocol message upon determining that the number of LSPs concurrently configured by the transit router and for which the transit router is responsible for switching packets to one or more of the two label edge routers is greater than the predetermined threshold.

7. The transit router of claim 5, wherein the transit router configured to determine the maximum number of LSPs concurrently supported by the transit router is further configured to:

determine a first maximum number of LSPs associated with a first priority; and determine a second maximum number of LSPs associated with a second priority, wherein the transit router configured to determine the number of LSPs concurrently configured by the transit router and for which the transit router is responsible for switching packets to the one or more of the two label edge routers is further configured to:

determine the number of LSPs associated with the first priority and concurrently configured by the transit router and for which the transit router is responsible for switching packets to one or more of the two label edge routers; and determine the number of LSPs associated with the second priority and concurrently configured by the transit router and for which the transit router is responsible for switching packets to one or more of the two label edge routers, and wherein the transit router configured to generate the link state routing protocol message is further configured to generate a link state routing protocol message that specifies the LSP session information as the first maximum number of LSPs and the number of LSPs concurrently configured and associated with the first priority and the second maximum number of LSP and the number of LSPs concurrently configured and associated with the second priority.

8. The transit router of claim 5, wherein the transit router configured to generate the link state routing protocol message is further configured to generate a link state routing protocol message that specifies the LSP session information as a minimum number of LSPs, the maximum number of LSP, and the number of LSPs concurrently configured.

9. A non-transitory computer-readable medium comprising instructions, that, when executed, cause a transit router intermediately positioned between at least two label edge routers to:
  receive, from one of the at least two label edge routers, a request to establish a first LSP; and
  in response to receiving the request to establish the first LSP:
    determine a maximum number of LSPs concurrently supported by the transit router;
    determine a number of LSPs concurrently configured by the transit router and for which the transit router is responsible for switching packets to one or more of the two label edge routers;
    generate, in accordance with a link state routing protocol, a link state routing protocol message that specifies the LSP session information as the maximum number of LSP and the number of LSPs concurrently configured;
    transmit, to the label edge routers, the link state routing protocol message and
    configure at least a portion of the first LSP.

10. The computer-readable medium of claim 9, further comprising instructions, that, when executed, cause the transit router to:
  determine whether the number of LSPs concurrently configured by the transit router and for which the transit router is responsible for switching packets to one or more of the two label edge routers is greater than a predetermined threshold; and
  transmit the link state routing protocol message upon determining that the number of LSPs concurrently configured by the transit router and for which the transit router is responsible for switching packets to one or more of the two label edge routers is greater than the predetermined threshold.

11. The computer-readable medium of claim 9, further comprising instructions, that, when executed, cause the transit router to:
  determine a first maximum number of LSPs associated with a first priority; and
  determine a second maximum number of LSPs associated with a second priority,
  wherein the instructions configured to cause the transit router to determine the number of LSPs concurrently configured by the transit router and for which the transit router is responsible for switching packets to the one or more of the two label edge routers are further configured to cause the transit router to:
    determine the number of LSPs associated with the first priority and concurrently configured by the transit router and for which the transit router is responsible for switching packets to one or more of the two label edge routers; and
    determine the number of LSPs associated with the second priority and concurrently configured by the transit router and for which the transit router is responsible for switching packets to one or more of the two label edge routers, and
  wherein the instructions configured to cause the transit router to generate the link state routing protocol message are further configured to cause the transit router to generate a link state routing protocol message that specifies the LSP session information as the first maximum number of LSPs and the number of LSPs concurrently configured and associated with the first priority and the second maximum number of LSP and the number of LSPs concurrently configured and associated with the second priority.

12. The method of claim 1:
  wherein generating the link state routing protocol message comprises generating a link state routing protocol message that specifies the LSP session information as a minimum number of LSPs, the maximum number of LSP, and the number of LSPs concurrently configured,
  wherein the method further comprises determining whether the number of LSPs concurrently configured by the transit router and for which the transit router is responsible for switching packets to one or more of the two label edge routers is greater than a predetermined threshold, and
  wherein transmitting the link state routing protocol message comprises transmitting the link state routing protocol message upon determining that the number of LSPs concurrently configured by the transit router and for which the transit router is responsible for switching packets to one or more of the two label edge routers is greater than the predetermined threshold.

* * * * *